May 19, 1931.   F. McS. THOMAS   1,805,962
PIPE JOINT
Filed Dec. 31, 1927   2 Sheets-Sheet 1
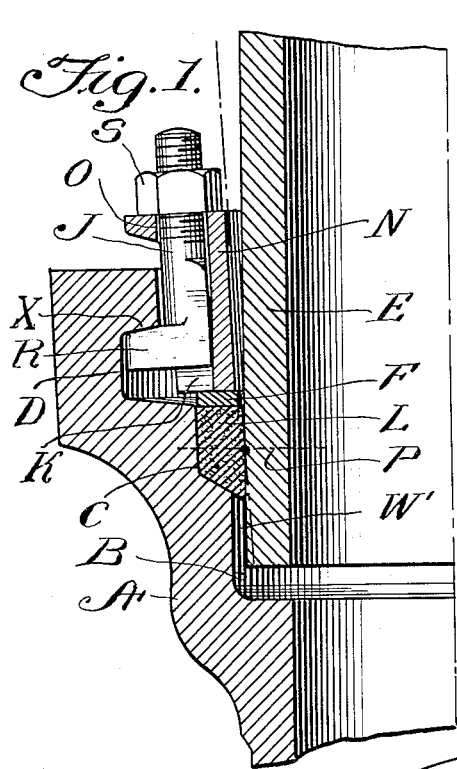
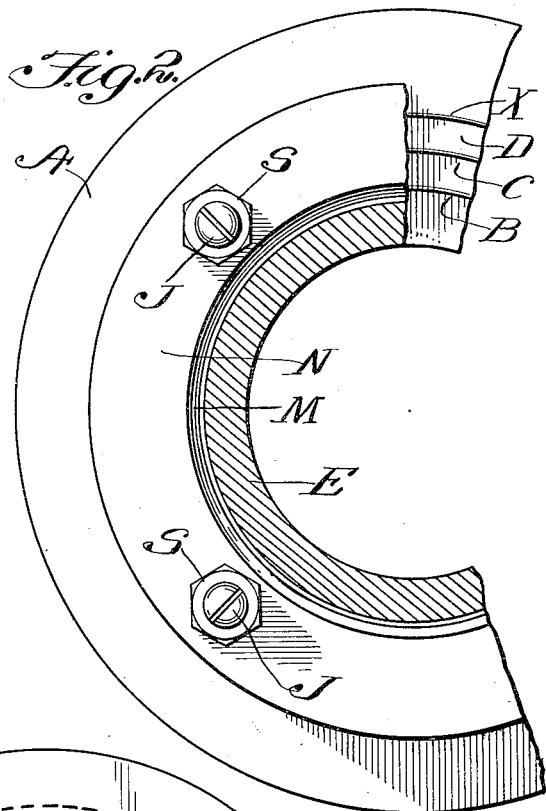
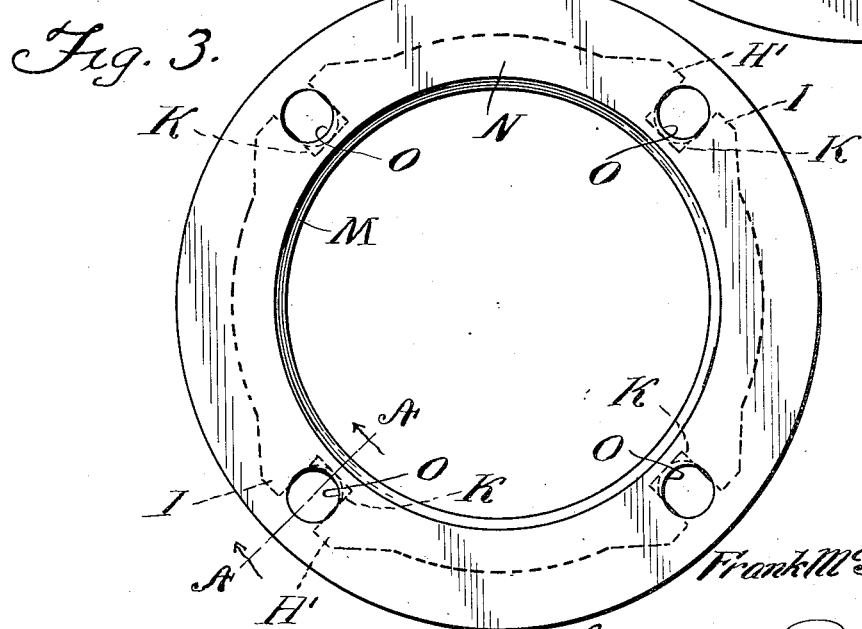
Inventor
Frank McS. Thomas

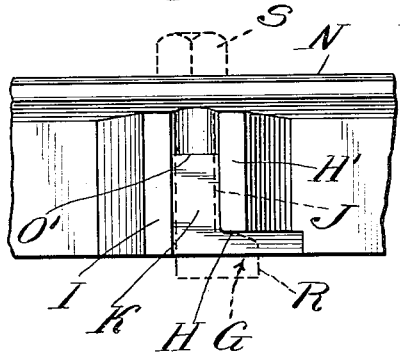
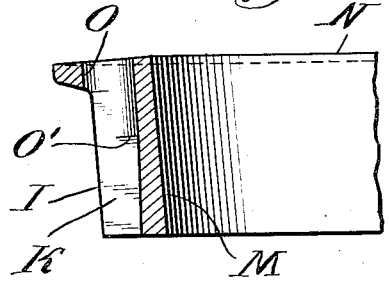
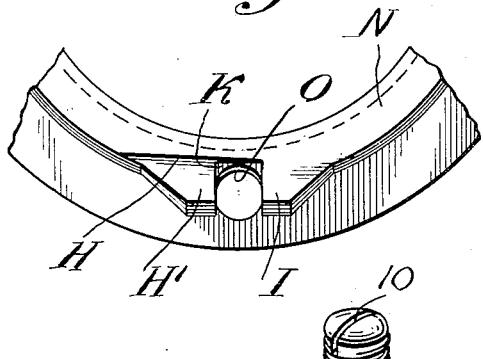
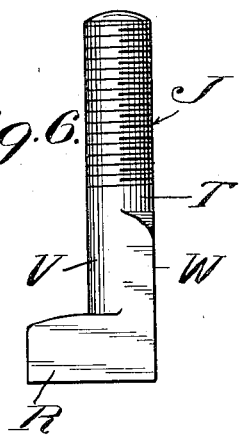
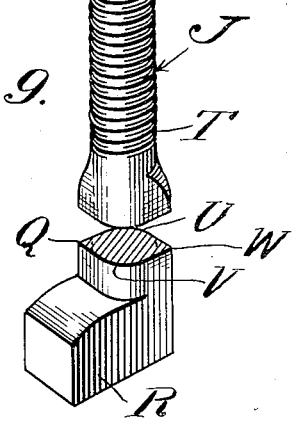
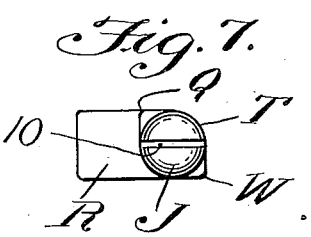

Patented May 19, 1931

1,805,962

UNITED STATES PATENT OFFICE

FRANK McS. THOMAS, OF EASTON, PENNSYLVANIA

PIPE JOINT

Application filed December 31, 1927. Serial No. 243,931.

This invention relates to improvements in pipe joints.

An object of the invention is to join sections of pipe or fittings in an improved manner so that the cost of the pipe line will be diminished, and the durability and effectiveness increased.

Another object of the invention is to provide a joint of novel construction which is capable of great flexibility so as to permit the line of pipe to be laid in other than a straight line.

A further object attained by the novel structure embodying the present invention is to render the pipe line immune to damage by settling or distortion subsequent to its installation.

Another object is the reduction of the labor of installation of the pipe line.

Other objects will appear hereinafter from the specification and claims and from the drawings.

The invention consists in the features, combination, and arrangement of parts hereinafter described and particularly pointed out in the claims.

In the drawings:

Figure 1 is a sectional view of a portion of the bell and pipe with the gland and its bolts therebetween.

Fig. 2 is a partial plan view of the bell and pipe and the intermediate gland with its hook bolts.

Fig. 3 is a top plan view of the gland.

Fig. 4 is a detail view of the gland with its socket construction for receiving the hook bolt shown in dotted lines.

Fig. 5 is a sectional view of the gland on line A—A of Fig. 3.

Figs. 6 and 7 are views of the hook bolt.

Fig. 8 is a bottom plan view of part of the gland.

Fig. 9 is a perspective view of the hook bolt.

Referring to the drawings:

The joint consists of a bell or socket member A having a recess B for receiving the pipe E, a recess C for receiving the packing L and a recess D for receiving the bolts J. Into the socket member or stuffing box A is inserted the end of pipe E, as shown in Fig. 1.

Packing L is then inserted into space C and a ring or segments F may be used to cover the packing. The use of such ring or segments F is preferred, though optional, for providing a better mechanical arrangement.

The gland N is of ring form and is adapted to bear upon the ring or segments F or upon the packing L, in case the ring or segments are omitted. The gland is provided with apertures O forming keyways K therein at spaced intervals about its periphery, for the reception of L shaped bolts J which are adapted to hold the gland to the bell A. When in final position these bolts are turned radially outward so that they engage the flange X of the bell in the groove D. The opening O is curved down to point O' (Fig. 4) from which point it is square forming keyway K, the reduction from rounded to square back being gradual.

Before inserting the gland the bolts are assembled in the gland in the manner shown at G, that is, with their bent or hooked ends R in a tangential position. The bolt then lies in the keyway K which keyway is interrupted at H permitting the hooked end R of the bolt to occupy the tangential position shown, hooked under the wall portion H' of the gland N.

After the insertion of the gland N, the bolts are rotated by wrenching the nuts S or in any suitable way until the hooked ends R assume a radial position, and lie in the groove D. The extent of rotation of the bolt is determined by the portion I of the gland adjacent the keyway.

Then as the bolts of the gland are tightened by wrenching the nuts S to draw the gland into the bell, the hooked end R of each bolt passes the space H to further enter the keyway K, and thereafter the bolt cannot be rotated in either direction out of engagement with the groove D, until the hooked end of the bolt again comes opposite to the space H upon loosening of the nut and bolt. The hooked end R of the bolt upon entering the keyway is guided and constrained by the walls of the keyway and therefore cannot rotate.

The shape of the bolts and of the keyways, as shown, is such that the bolts are capable of a partial rotation before entry of the hooked ends into the keyways but rotation is prevented upon full entry into the keyway.

As shown in Fig. 7, the cylindrical shank T of the bolt gradually changes to generally square shape except for two rounded corners U and V. This shape permits the rotation of the bolts and also the locking in the keyway. The bolts are prevented from leaving the keyway by their contact with the gland N.

The bolt has corners Q and W. These are not necessary for the proper operation of the locking of the bolt provided that the fits between the bolt and keyway and between the bolt and bell and its socket are very neat. However, it is intended that neither the bell nor the gland be finished by machining, and consequently the fits will be necessarily somewhat loose. Therefore to aid in the better securing of the bolt in the keyways the corners Q and W are provided. In order to properly operate the bolt having these corners, it is necessary that the bolt rise in the keyway in making a 90° turn. To permit the rise or move outwardly there must be sufficient space between the shank of the bolt and the interior of the flange X of the bell. Whether the shank rises above the bell is determined by the keyway in turning. In the embodiment shown in order for the bolt to turn, the corner Q rises slightly above the keyway walls. This rise is permitted by the loose fit of the shank in the circular hole at the top of the gland, the flange X of the bell being at least this distance from the tops of the keyway.

The corner W prevents a tendency for the bolt to crawl out of the keyway and prevents the bolt from making a rotation of more than 90°, even when subjected to great torque induced by using a wrench on a tight nut. The corner Q plays a like part when the nut is loosened.

The bolt when in tangential position with its hook occupying the space H, projects below the gland. With all the bolts in tangential position the gland is inserted in the bell so that the bottoms of the hooks rest against the packing, or the ring which may be used on top of the packing. In this position the hooks are opposite the groove D. All the bolts are then rotated approximately 90° into the groove D. With the bolts in this radial position the gland may be pushed down into contact with the packing or packing ring, thus securing an immediate lock on the bolts prior to wrenching the nuts. The amount of this initial locking is about one-half of the hook depth.

The gland N is tapered on its interior as shown at M in Fig. 5.

Diametrical clearance W' between the bell and the abutting pipe is provided in recess B, as shown in Fig. 1, so that the pipe may deflect; its angular motion being about a center located in the packing L and along some line P.

This flexible condition is important in maintaining tightness under deflection or vibration. In laying a line of pipe underground, for example, the line may first be assembled on the surface of the ground, the joints tightened and the whole line of flexibly connected pipe then rolled or lowered into the trench the novel construction maintaining tightness of joint under these conditions.

To remove the gland, the nuts may be loosened sufficiently to permit the bolts to move in the keyway relative to the gland until they can be turned with their hooks in the tangential position shown in Fig. 4 whereupon the gland with the bolts therein may be removed. It will also be apparent that in disconnecting the joint, the nuts may first be entirely removed and the gland then withdrawn leaving the bolts in place, and afterward removing the bolts.

The construction of this joint lends itself to ease of casting in the usual manner and without change in present methods. A distinct advantage is that no lugs are required and also protection of the gland and bolts against injury or corrosion is provided by their location within the bell. The number of bolts used may be increased or dimished according to the different pressures or other requirements.

In this design the number of parts is reduced and the parts are so arranged that the gland and its bolts can be assembled independently of the pipe or stuffing box and afterwards inserted into the bell and over the abutting pipe.

The packing L, which is inserted in the bell prior to the insertion of the gland, and which the gland is adapted to bear upon and compress may be of any suitable material, but is preferably elastic and of sufficient depth so that it will yield or give flexibly without injury when the pipe line is distorted under pressure or otherwise.

The joint may be used to join pipes with plain or beaded ends.

The gland may be made in one piece or in a plurality of sections either joined together or inserted separately. In the event that such sections are joined they support each other against the pull of the bolts. If they are not joined they are supported by the internal surface of the bell or socket.

As illustrated in the drawing at 10, the extreme outer end of the bolt is provided with a kerf for receiving a screw driver by which the bolt may be turned so that the lateral projection on the inner end of the bolt may be turned from a tangential to a radial position. If the nut fits tightly upon the bolt, the wrenching of the nut in the proper direction to draw upon the bolt will, at the same time, turn the bolt to move its projection from a tangential to a radial position. If the nut should fit loosely upon the bolt so that it could be turned upon the bolt without thereby turning the latter, the bolt, in such case, can be turned by using a screw driver in the kerf 10 and the lateral projection, therefore, can be set in radial position, after which the turning of the nut will draw the bolt axially into place.

I claim:

1. A flexible pipe joint comprising a bell, an abutting pipe within said bell, ring-shaped packing between said pipe and bell, said packing forming the sole contacting connection between said pipe and bell and spacing them apart so that they may be misaligned flexibly about the packing as a pivot, a ring-shaped gland between the pipe and bell extending within the mouth of the bell and spaced from the pipe and bearing on said packing, and means slidably and rotatably associated with said gland for engaging the bell internally thereof.

2. Apparatus according to claim 1 in which said bell is flared and is provided internally thereof with an outer groove of largest diameter for receiving the said means, an intermediate groove of intermediate diameter forming a seat for said packing, and an inner groove of smallest diameter for receiving the end of said pipe.

3. Apparatus according to claim 1 in which said means comprises bolts each of which has a shank, a portion of which is of generally square cross-section, but with two diagonally opposite edges rounded.

4. A pipe joint comprising a bell having an inwardly extending flange, an abutting pipe in said bell, a gland of general ring form surrounding said pipe and interposed between said pipe and bell, bolts extending within the mouth of the bell and mounted for axial movement in said gland, said bolts having lateral projections and being adapted to be turned either with their lateral projections in radial or tangential position relative to said gland, and means for preventing turning of said bolts when they are moved axially with their lateral projections in radial position to engage beneath the flange of the bell, and means for preventing axial movement of said bolts on said gland when the lateral projections are moved to tangential position.

5. A pipe joint comprising a bell having an inwardly extending flange, an abutting pipe in said bell, a gland of general ring form surrounding said pipe and interposed between said pipe and bell, said gland having an outwardly extending flange at its top and having bolt holes therethrough at spaced intervals about its periphery, said gland having grooved keyways therein disposed below the bolt holes and in axial communicating alinement one with each bolt hole, said gland having recesses disposed one adjacent one side of the lower end of each keyway and in tangential communication therewith, one side wall of each keyway extending for the full depth of the gland below its flange, the other side wall of each keyway being cut short by the tangential recess, hook bolts slidably and rotatably mounted in said bolt holes and keyways and each being of a length to be slid with its hook below the shortened wall and rotated with the hook in tangential position in the recess beneath the shortened wall.

6. Apparatus according to claim 5, in which said holes are circular and the keyways square, there being a gradual merger therebetween.

7. A pipe joint comprising a bell having an inwardly extending flange, an abutting pipe in said bell, a gland of general ring form surrounding said pipe and interposed between said pipe and bell, said gland having bolt-receiving keyways disposed at spaced intervals about its periphery, said gland having recesses disposed one adjacent one side of the lower end of each keyway and in tangential communication therewith, hook bolts slidably and rotatably mounted in said keyways and each being of a length to be slid axially with its hook adjacent the tangential recess and rotated into tangential position in said recess.

8. A pipe joint comprising a bell having an inwardly extending flange, an abutting pipe in said bell, a gland of general ring form surrounding said pipe and interposed between said pipe and bell, said gland having bolt-receiving keyways therein at spaced intervals about its periphery, said keyways being square in cross-section, said gland having recesses disposed one adjacent one side of the lower end of each keyway and in tangential communication therewith, hook bolts in said keyways having shank portions of general square cross-section but with two diagonally opposite edges rounded and being of a length to be slid axially with its hook adjacent the tangential recess and rotated into tangential position in said recess, said square corners of the bolts cooperating with the square walls of the keyways to provide means for limiting the rotary movement of the bolt in both directions to locate the hooks in either tangential or radial position relative to said gland.

9. A pipe joint comprising a bell having an inwardly extending flange, an abutting pipe in said bell, a gland of general ring form surrounding said pipe and interposed between said pipe and bell, anchor means carried by said gland adapted to engage beneath the inwardly extending flange internally of the bell, and means whereby said gland and its anchor means in place in the gland may be inserted and removed from operative position between the pipe and bell without removal of the anchor means from the gland.

10. A pipe joint comprising a bell internally flanged, a pipe extending into said bell, a gland between said pipe and bell, bolts having lateral projections at their inner ends to engage beneath the flange internally of the bell, said bolts being slidably and rotatably mounted on the gland and adapted to be positioned with the lateral projections substantially tangential to the gland for insertion of the gland and bolts into the bell and means for locking the bolts against rotation when they are rotated to position said projections radially to the gland and are being drawn up to engage their projections with the bell flange.

11. A pipe joint comprising an internally flanged bell, a pipe extending into the bell, a gland, bolts carried by the gland and having lateral projections, said bolts being turnable in one direction on the gland to position their lateral projections substantially tangential to and for insertion into the bell as a unit with the gland, and stop means on the gland for arresting the projections in radial position when the bolts are turned in the opposite direction, substantially as described.

12. A pipe joint according to claim 11 having means for holding the bolt against rotary movement in either direction when drawn up to position with its lateral projection against the bell flange.

13. A pipe joint comprising a bell internally flanged, a pipe extending into said bell, a gland between said pipe and bell, bolts having lateral projections at their inner ends to engage beneath the flange internally of the bell, said bolts being slidably and rotatably mounted on the gland and adapted to be positioned with the lateral projections substantially tangential to the gland for insertion of the gland and bolts into the bell.

14. A pipe joint comprising a bell having an inwardly extending flange, an abutting pipe in the bell, a gland within the bell, bolts having lateral projections, said bolts being mounted on the gland for axial and rotary movement, and means for limiting the rotary movement of the bolts in both directions to locate the lateral projections thereof in either tangential or radial position relative to the gland.

15. A pipe joint according to claim 13 in which a part of the gland limits the rotary movement of the bolt to determine its substantially tangential position relative thereto.

16. A pipe joint according to claim 13 in which parts on the gland limit the rotary movement of the bolt to determine the tangential and also a substantially radial position of the lateral projection relative to the gland.

17. A pipe joint according to claim 13 in which a nut on the outer end of the bolt draws the same axially and in which the rotary movement of the bolt is limited to position said lateral projection substantially radial to the gland while the nut is being turned, said bolt having means at its outer end by which it may be turned.

18. A pipe joint according to claim 13 in which the bolt has a limited rotary movement on the gland to position the lateral projection either substantially radial to the gland or substantially tangential thereto, a nut for moving the bolt axially and a lock by which the bolt is prevented from having axial movement while its projection is tangential to the gland and is prevented from having rotary movement while it is being drawn axially with its projection positioned radially of the gland.

19. A pipe coupling according to claim 13 in which the rotary bolts are also adapted to be positioned with the lateral projections radial to the gland, the said rotary movement being limited to an arc extending between said tangential and radial positions.

In testimony whereof, I affix my signature.

FRANK McS. THOMAS.